Nov. 21, 1961  W. KUEHNE ET AL  3,009,271
AUTOMATIC CONTROL OF EARTH-MOVING MACHINES
Original Filed May 21, 1956  6 Sheets-Sheet 5

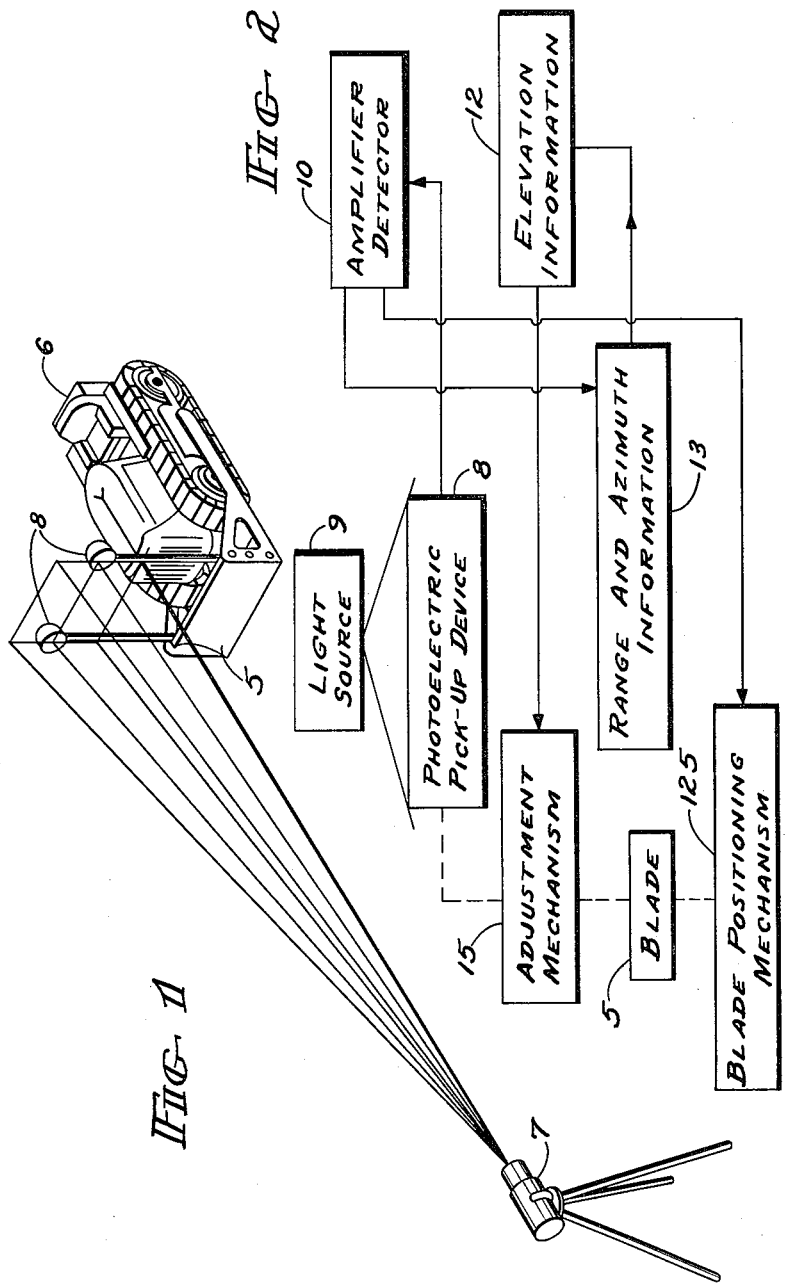

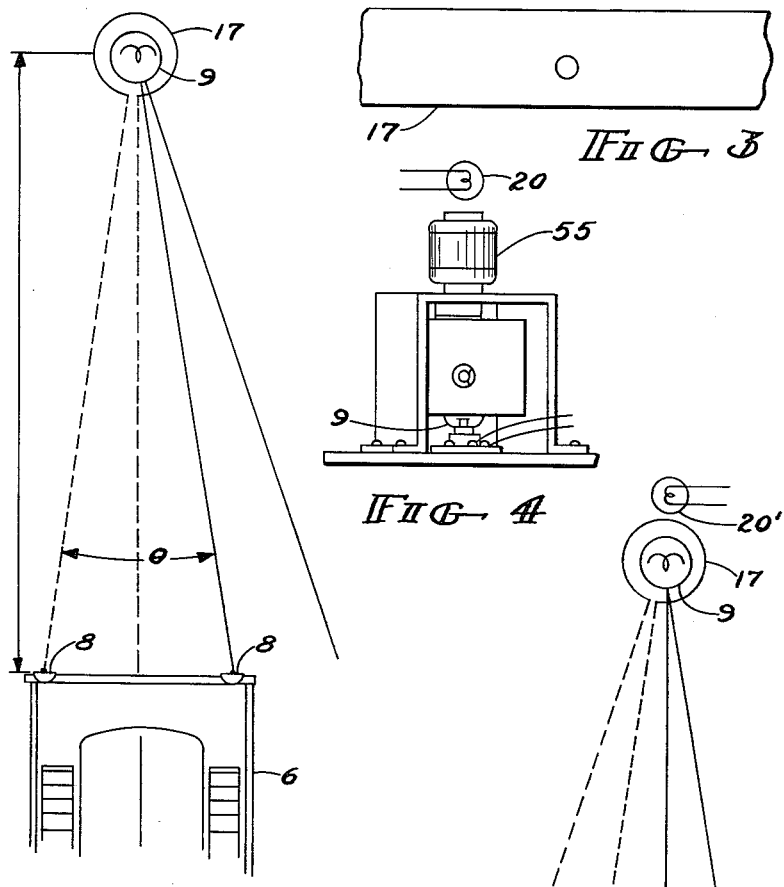

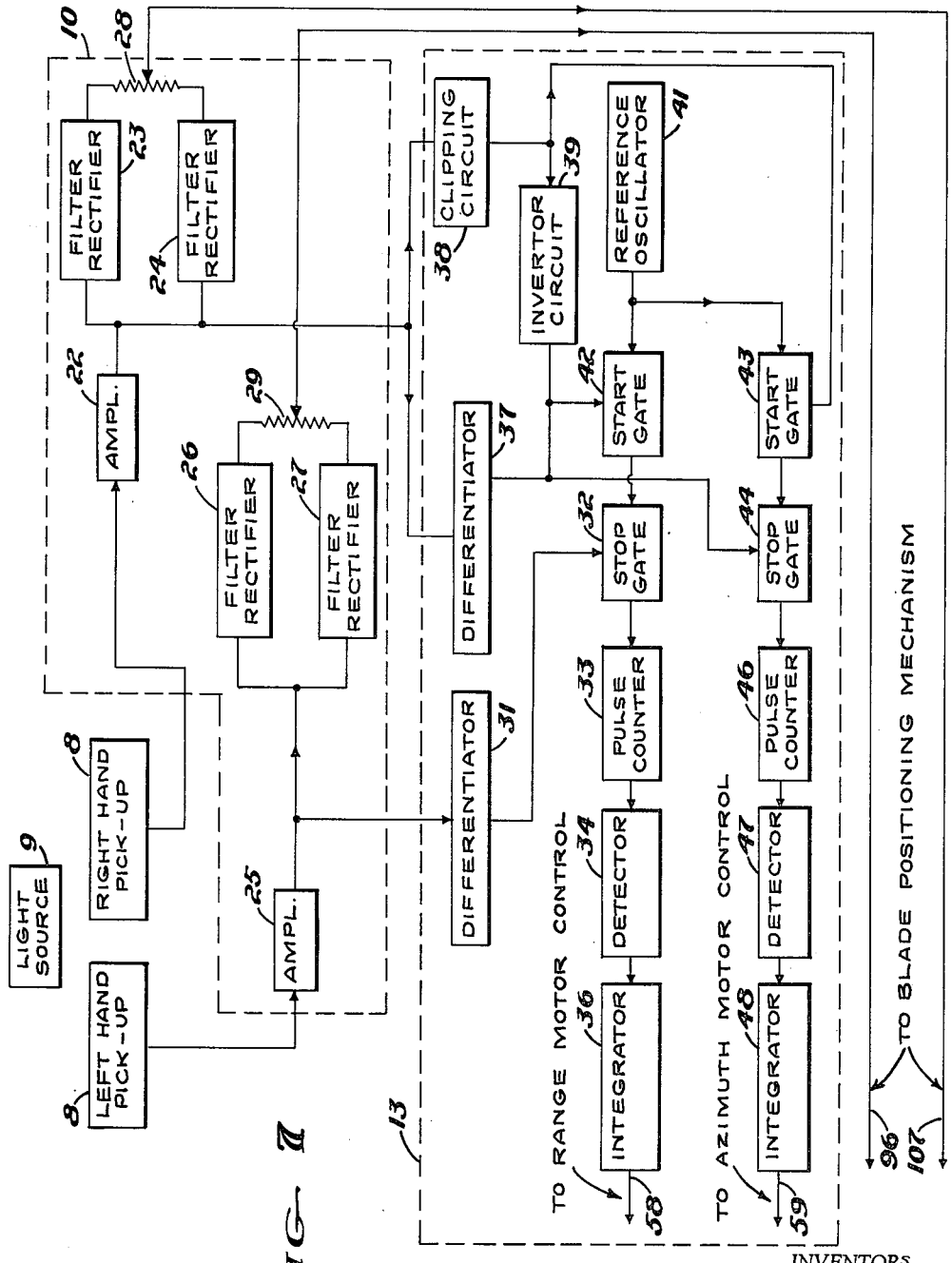

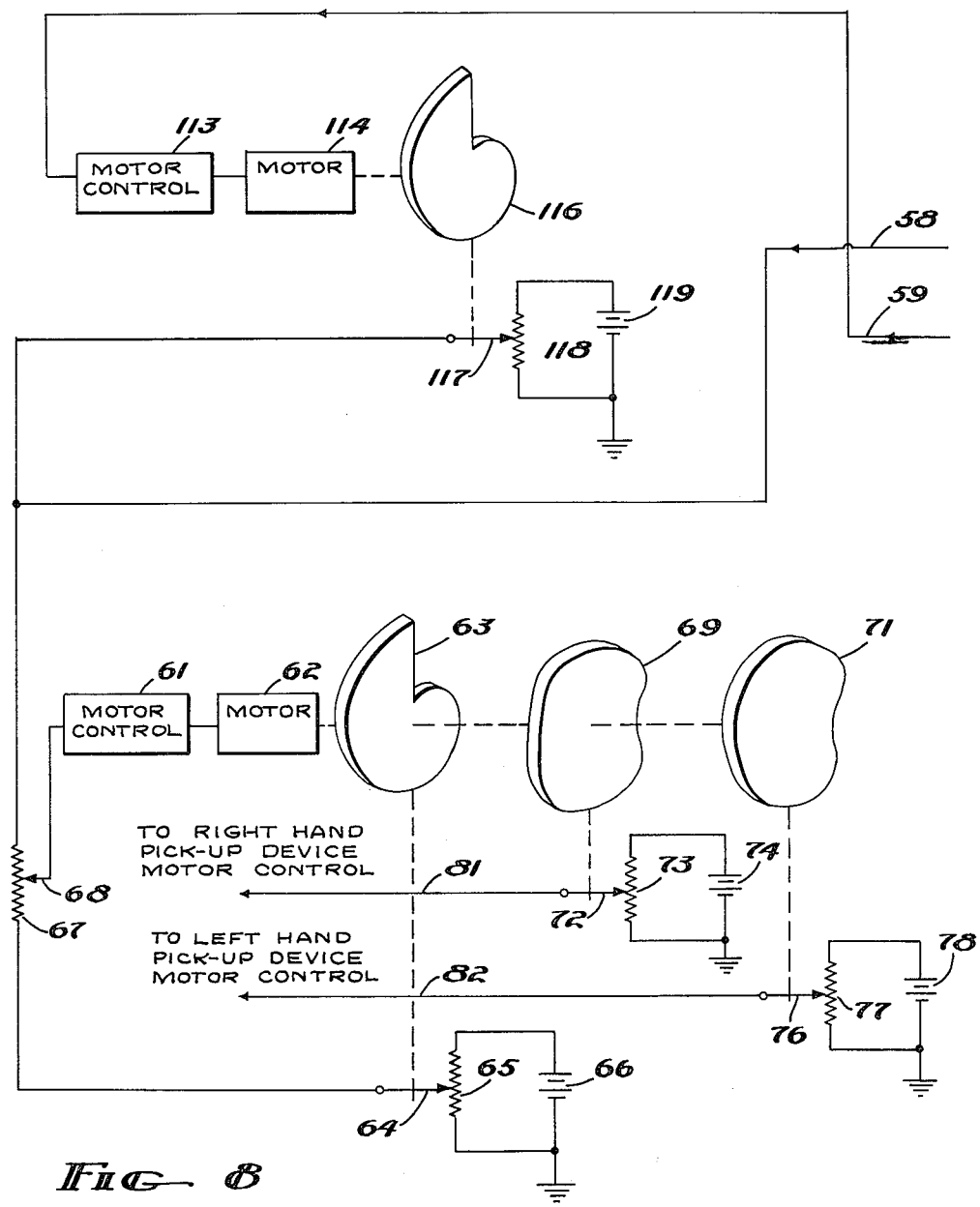

INVENTORS
WALTER KUEHNE
DAVID O. MARTIN
FRANK J. OCNASCHEK
BY Moody and Phillips
ATTORNEYS

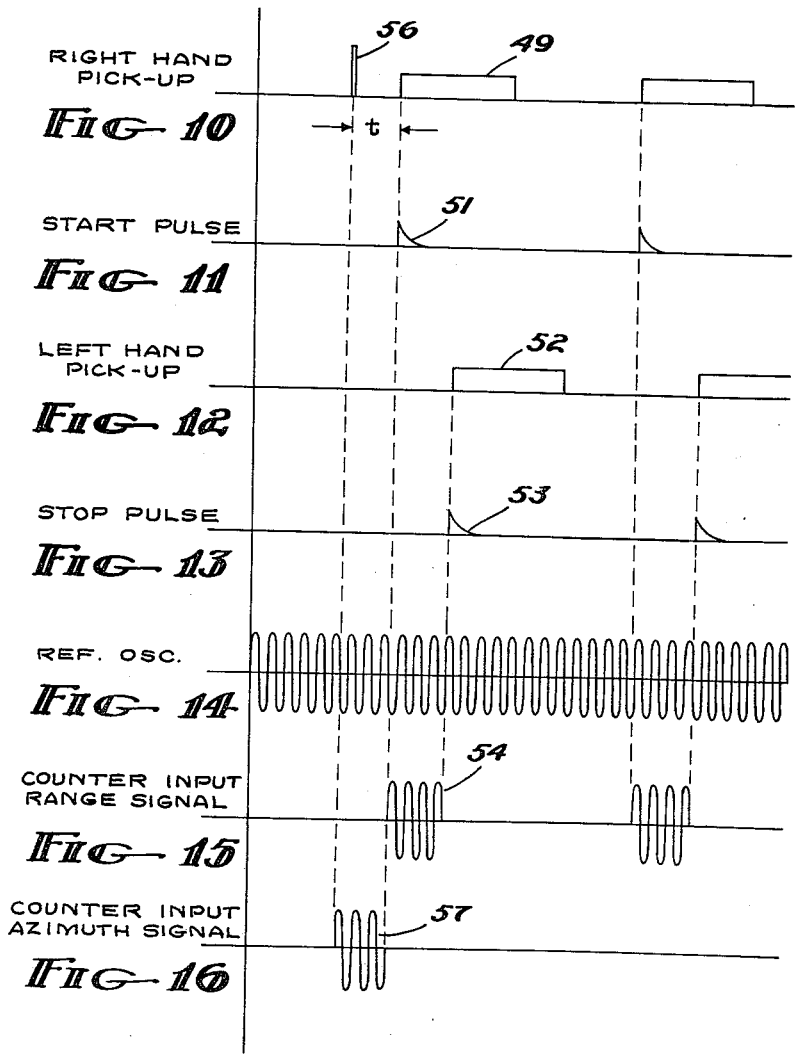

United States Patent Office 3,009,271
Patented Nov. 21, 1961

3,009,271
AUTOMATIC CONTROL OF EARTH-MOVING MACHINES
Walter Kuehne and Frank J. Ocnaschek, Dallas, Tex., and David O. Martin, La Canada, Calif., assignors to Collins Radio Company, Cedar Rapids, Iowa, a corporation of Iowa
Substituted for abandoned application Ser. No. 586,202, May 21, 1956. This application Nov. 18, 1959, Ser. No. 853,978
3 Claims. (Cl. 37—143)

This application is a substitute for an abandoned application filed May 21, 1956, for "Automatic Control of Earth Moving Machines" by Walter Kuehne, David O. Martin, and Frank J. Ocnaschek and having the Serial Number 586,202.

This invention relates to the automatic control of earth-moving machines and more particularly to the automatic control of an earth-moving machine for complex grading.

This invention is an improvement over the vertical control system described and claimed in co-pending application Serial Number 586,197, filed May 21, 1956, by David O. Martin and Frank J. Ocnaschek and entitled "Automatic Vertical Control of Earth Moving Machines" and is hereby incorporated as a part of this specification. The vertical control of the earth-moving machine described and claimed therein is not sufficient in itself to adequately prepare roadbeds or other earth contours which are not perfectly level. Proper camber of the road and the proper grade on curves are a requisite for today's fast-moving traffic. These variables require complex grading in the preparation of the roadbed. To provide an accurate control system which will handle these complex grading problems, it is necessary to have more than one control on an earth-moving machine.

Included in this invention is a programming system which will control the position of the blade on an earth-moving machine so as to cut a grade to conform with a predetermined engineering specification. The engineering specification may be placed on pre-cut cams or other suitable means for providing a detailed problem analysis to a computer. It is necessary, for the accurate control of an earth-moving machine in a grading problem involving variable tilt and elevation of the blade, to obtain accurate range and azimuth information. This range and azimuth information must be correlated to the predetermined engineering specification and a fixed geographical point so that the blade of the earth-moving machine may be positioned to cut the desired earth contour.

This invention provides a light source or a plurality of light sources which are modulated. This modulation is accomplished by the perforation of cylinders which are rotated about a light source. The signals from these light sources are picked up by means of photo-electric cells on the earth-moving machine. These signals are then amplified and detected so that the position of the earth-moving machine with respect to the light source is determinable. This invention further provides for a program of contouring to be accomplished by the earth-moving machine. Desired range and azimuth information, as well as elevation information, is fed into an adjustment mechanism which adjusts the location of the photo-electric cells upon the earth-moving machine. The light source is located at a fixed geographical point so that the adjustment for a predetermined contour may be made with reference to the fixed point.

It is a feature of this invention that grading problems may be accurately solved by incorporating a predetermined engineering analysis and an instantaneous situation analysis to provide a control signal for the blade of an earth-moving machine. The instantaneous situation analysis is made with relation to the fixed geographical location, which is also used as a basis for the predetermined engineering analysis. The instantaneous situation analysis is compared in a computer with the predetermined engineering analysis and a resultant control signal is generated. This control signal is applied to an adjustment mechanism to adjust the position of the blade so as to cut the earth's surface in the predetermined contour.

It is another feature of this invention that the instantaneous situation analysis is accomplished by the use of light sources and photo-electric pick-up devices. It is a still further feature of this invention that the cutting device of an earth-moving machine may be positioned accurately in more than one plane.

It is an object of this invention to provide a control system for an earth-moving machine which will control the earth-moving machine so as to cut a contour in more than one plane. It is a further object of this invention to provide this control system so that the contour is cut to coincide with a predetermined specification.

These and other objects of this invention will become apparent when the following description is read in conjunction with the drawings, in which:

FIGURE 1 is a view of the instrument containing the light sources and the earth-moving machine;

FIGURE 2 is a block diagram of the control system of this invention;

FIGURE 3 is a laid-out view of the cylinder for modulating the light source;

FIGURE 4 is a view of the cylinder in position about the light source;

FIGURE 5 is a schematic view showing how range information is obtained by this invention;

FIGURE 6 is a schematic showing how azimuth information is obtained by this invention;

FIGURE 7 is a detailed block diagram of a portion of the block diagram of FIGURE 2;

FIGURE 8 is a schematic representation of another portion of the block diagram of FIGURE 2;

FIGURES 10 through 16 show voltage waveforms at various points in the system.

Figure 9:
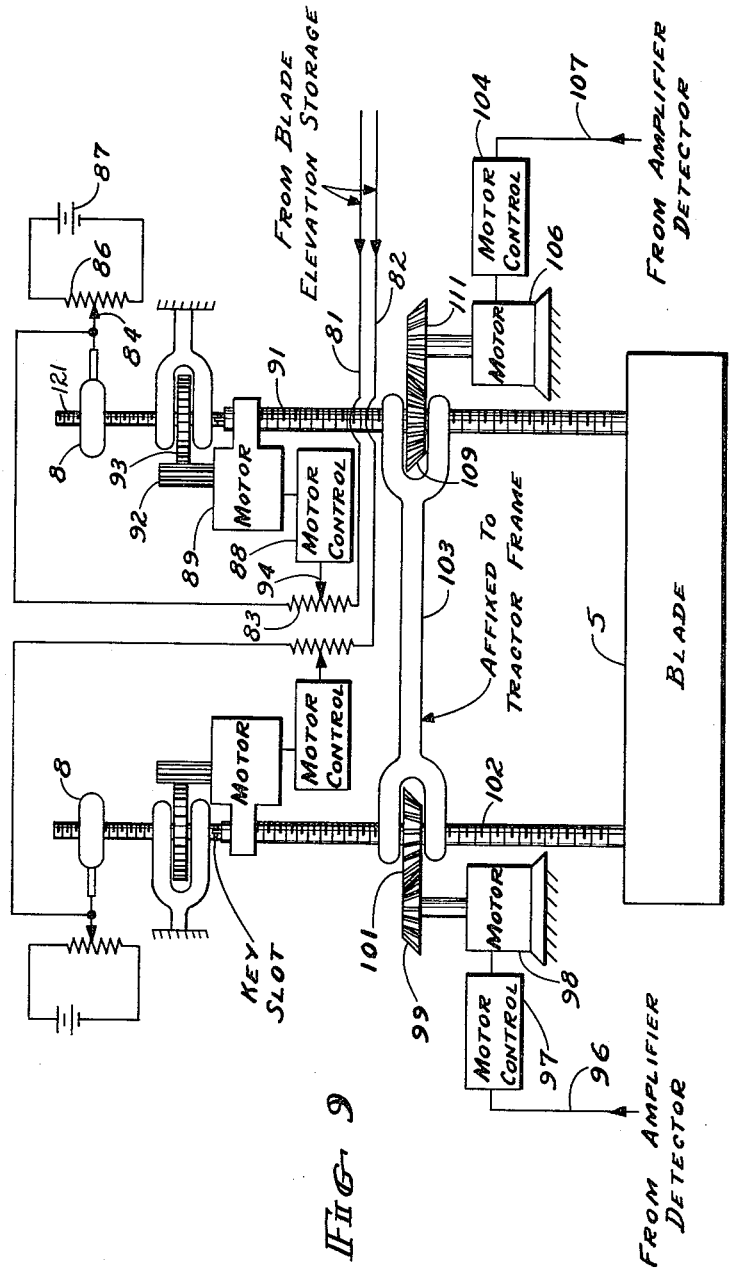
FIGURE 9 is a skeletal structural representation of another portion of the diagram shown in FIGURE 2.

The control of the blade 5 of the earth-moving machine 6 is done with a plurality of light sources located in a transit-type instrument 7 and the photo-electric cells 8. One light source located in instrument 7 of FIGURE 1 sends forth the signals to be utilized in the vertical control of the blade 5. Vertical control of the blade is accomplished by modulating the light source with two different frequencies and then determining whether the photo-electric cells are above or below the line between the frequencies. This vertical control system for the blade of an earth-moving machine is completely described in co-pending application Serial Number 586,197 mentioned hereinbefore.

The present invention in order to accurately position the blade in more than one plane must have accurate range and azimuth information of the earth-moving machine from a fixed reference point. The control of the earth-moving machine in a complex grading problem is made to conform to a predetermined engineering specification. The instrument 7 is accurately positioned and thus the light sources located therein will at all times emanate from a fixed location.

Instrument 7 is located in a predetermined geographical position, a specification for the grading is then developed to correspond to this location. An analysis of the grading problem is then made and recorded as on pre-cut cams for future use. For example, the analysis might indicate that when the earth-moving machine is eight feet from the instrument 7, the blade of the earth-moving machine should make a cut of six feet in depth. Additionally, at this distance the analysis may also show the right side of the cutting blade inclined at an angle of two degrees above the horizontal. This program of predetermined engineering information is fed to the pick-up adjustment mechanism 14 of FIGURE 2 by punch cards, pre-cut cams, or some other similar method of presenting detailed engineering information.

FIGURE 2 is a block diagram of the entire control system and illustrates the over-all functions of the system. The light source 9 located in instrument 7 (FIG. 1) projects a light which is picked up by the photoelectric device 8 (comprised of two photo-electric pick-up devices). The output signals of the photo-electric pick-up devices are supplied to an amplifier-detector circuit 10, which functions to separate the blade elevation adjusting signal information from the range and azimuth information. The blade elevation adjusting signal information is supplied to the blade positioning mechanism 125 which functions to adjust the blade elevation in accordance with the specific structure set forth in the aforementioned co-pending application Serial No. 586,197. The range and azimuth indicating information is supplied to the block 13 which functions to separate the azimuth information from the range information and to produce independent signals representing azimuth and range. The azimuth and range representing signals are supplied to the elevation information storage apparatus represented generally by the block 12 which responds thereto to produce a pair of signals which are indicative of the correct position of the two photo-electric pick-up devices 8 with respect to the blade 5. As will be seen in more detail later, in connection with the structure of FIGURE 9, the pick-up adjustment mechanism 15 is constructed to respond to the aforementioned pair of signals to move the pick-up devices 8 up and down with respect to the blade 5 and independently of each other. Consequently, since the vertical elevation of the pick-up devices is maintained at a constant elevation by means of the structure set forth in the aforementioned co-pending application, it can be seen that moving the pick-up devices up or down with respect to the blade will change the blade elevation by a corresponding inverse amount. As will also be described in more detail later, the two pick-up devices can be controlled independently so that the blade 5 can be tilted to a desired degree.

Range and azimuth information, that is instantaneous range and azimuth information, will be obtained from the light source 9 and the photo-electric pick-up devices as shown in FIGURES 3, 4, 5, and 6. The vertical control of the blade may be accomplished by a separate cylinder on light source 9 or by a separate light source and a separate cylinder, but can be exactly like the vertical control system shown in co-pending application Serial Number 586,197. As shown in FIGURE 4, a second rotating beam of light is developed by light source 9. The cam or cylinder 17 shown in FIGURE 3 is placed around the light source 9, as shown in FIGURE 4, and driven by motor 55.

Range information is obtained in this invention by measuring the time required for one of the rotating light beams generated by light source 9 and cylinder 17 to traverse the distance between the pick-up devices 8 as shown in FIGURE 5. The revolving beam of light generated by the perforation in the cylinder 17 will pass the photo-electric devices 8. The angle $\theta$ subtended by the two photo-electric pick-up devices 8 on the earth-moving machine 6 and the light source 9 will vary as the earth-moving machine approaches the light source 9. The time required for each light beam to move between the two photo-electric pick-up devices will vary as the angle $\theta$ varies. Thus by using gating and counting or similar circuits, the time it takes for a light beam to traverse the fixed distance between the photo-electric pick-up devices can be measured. Knowing the time it requires the light beam to traverse the fixed distance, the angle $\theta$ may be determined. Knowing the fixed distance between the photo-electric pick-up devices and the angle $\theta$ the distance from the earth-moving machine to the light source can be determined for various values of $\theta$ assuming, of course, that the tractor is always pointed directly toward the light source. Since the tractor is not always so directed, some correction must be made for the resultant changes in $\theta$. Such corrections can be made by programming the path of the tractor and for any given azimuth which would represent a change in the position of the tractor, a correcting voltage will be introduced to correct the angle $\theta$.

Azimuth information for comparison with the predetermined engineering specification is obtained as shown in FIGURE 6. The synchronizing beam shown in FIGURE 6 is obtained from omnidirectional light source 20' which flashes once each revolution of the cylinder 17. It is to be noted that the light 20' is always flashed when the cylinder is in the same angular possition relative to a fixed reference point.

More specifically, assume that the synchronizing light always flashes when a given rotating beam is in the angular position shown by the solid lines in FIGURE 6. It can be seen, then, that the azimuth $\phi$ is proportional to the time elapsed between the synchronizing pulse and the impingement of the said rotating beam upon the right-hand pick-up device 8 of FIGURE 6. If, in FIGURE 6, a photo-electric cell or pick-up device were located at point A, the synchronizing pulse and the rotating beam would be received by the right-hand pick-up device at the same instant. Similarly, a pick-up at point B in FIGURE 6 will receive the synchronizing pulse a short time before it receives the range pulse.

Referring now to FIGURE 7, there is shown a detailed block diagram of the light source, the pick-up devices, and the general blocks 10 and 13 of FIGURE 2, which are shown within broken line blocks in FIGURE 7.

The operation of the diagram of FIGURE 7 will now be described. Such operation can be divided into two parts, e.g., the production of signals for maintaining the pick-up devices at a desired elevation, and the production of signals indicative of range and azimuth.

The structure for maintaining the pick-up devices at a desired elevation (i.e., blade positioning) is described in co-pending application Serial No. 586,197 mentioned hereinbefore. The filter rectifiers 23, 24, 26, and 27 and the impedances 28 and 29 function to produce the blade positioning signals in the manner set forth in said co-pending application.

As discussed hereinbefore, range is determined by sweeping a rotating light beam across the right-hand pick-up device and then the left-hand pick-up device in that order. As the beam sweeps across the right-hand pick-up device a pulse 49 (FIGURE 10) will be generated therein. Such pulse will be amplified by amplifier 22 and then differentiated by differentiator 37 to produce a pulse 51 (FIGURE 11). Pulse 51 functions to open start gate 42 to permit the transmission of the output signal (FIGURE 14) of oscillator 41 to pulse counter 33 through non-activated stop gate 32. Such signal transmission will continue until the rotating light beam impinges on the left-hand pick-up device to produce a signal 52 (FIGURE 12) which is amplified by amplifier 25 and then differentiated by differentiator 31 to produce a pulse 53 (FIGURE 3) which is applied to the stop gate 32. In response to such pulse the stop gate 32 will cut off the transmission of the oscillator output signal to the pulse counter 33. Thus the amount of oscillator output signal supplied to the counter 33 is represented by the waveform 54 of FIGURE 15. Such a signal burst is then detected and integrated by dector 34 and integrator 36 to produce a D.-C. signal whose amplitude is proportional to range.

The manner in which this signal is employed will be discussed later herein.

As stated hereinbefore, azimuth is determined by the elapsed time between a synchronizing pulse and the impingement of a rotating beam upon the right-hand pick-up device. The synchronizing pulse is of considerably greater intensity than the rotating beam and consequently the right-hand pick-up device will produce a greater output signal in response thereto.

The pulse waveform 56 of FIGURE 10 represents the pulse generated by the right-hand pick-up device 8 in response to a synchronizing pulse. Such a pulse 56 is amplified by amplifier 22 and then supplied to differentiator 37 and to clipping circuit 38. The clipping circuit 38 is constructed to clip at an amplitude just greater than the amplitude of the start pulse 49. Consequently the top portion of the synchronizing pulse 56 will pass through the clipper circuit 38 and will be supplied both to the start gate 43 and to the inverter circuit 39. The inverter circuit 39 will respond to the clipped pulse to produce a negatively poled pulse to cancel the output signal of the differentiator 37 at this time. Thus, the start gate 42 will not be opened by a synchronizing pulse. However, the start gate 43 will be opened by the clipped pulse to permit passage of the output signal of the oscillator 41 to the pulse counter 46. When the next start pulse 49 occurs the output signal of the differentiator 37 will function to close the stop gate 44 to prevent further passage of the oscillator 41 output signal to the counter 46. Thus, the signal burst 57 represents azimuth. Detector 47 and integrator 48 function to produce a D.-C. signal whose magnitude varies with azimuth.

The range indicating signal from integrator 36 is supplied to conductor 58 of FIGURE 8 and thence to motor control 61 through voltage divider resistor 67. The other terminal of resistor 67 is connected to a point on resistor 65 through movable contact 64. Battery 66 is connected across resistor 65.

As the D.-C. potential supplied to the conductor 58 increases or decreases with range change, the potential of the point 68 will change and the motor control will function to operate the motor 62 to rotate the cam 63. Rotation of the cam 63 will move the movable contact 64 until the potential of the point 68 again assumes its normal magnitude, i.e., a magnitude calling for no rotation of the motor 62. It can be seen that for each value of range the cam 63 will assume a particular angular position. Mechanically coupled to said cam 63 are the two cams 69 and 71 which function to drive movable contacts 72 and 76, respectively. Resistors 73 and 77 and battteries 74 and 78 function to supply predetermined voltages to the contacts 72 and 76 as said contacts are moved to various positions. The voltage supplied thereto are representative of the desired positioning of the pick-up devices on the tractor. This will be more apparent from the following detailed description of FIGURE 9.

In FIGURE 9 the output signal from the movable contact 72 is supplied to a first terminal of voltage divider resistor 83. The other terminal of the voltage divider resistor 83 is connected to a movable contact 84 which is movable along resistor 86. Battery 87 is connected across resistor 86. As the magnitude of the signal from the movable contact 72 (FIGURE 8) varies, the potential of the point 94 on resistor 83 (FIGURE 9) will vary to energize the motor control 88 so that the servo-motor 89 will operate. Operation of motor 89 will raise or lower pick-up device 8 by means of gear arrangement including gears 92 and 93. The gear 93 is threaded in the aperture through which the shaft 121 passes and functions to raise or lower the shaft 121 as it (the gear 93) is rotated. The raising or lowering of the shaft 121 is accomplished by virtue of the fact that it fits within an aperture provided therefor in the shaft 91 and is keyed to the interior wall of the shaft 91 to prevent free rotation with respect to said shaft 91. The motor means 89, which drives the gear 92, is fixed rigidly to the shaft 91. The movable contact 84 is secured to the pick-up device 8 so that it will move therewith. Movement of the movable contact 84 and the pick-up device 8 will continue until the potential of point 94 assumes its normal value. It can be seen readily that the shape of the cam 69 of FIGURE 8 can be cut to produce predeterminable positioning of the pick-up device in accordance with the measured range.

The positioning of the left-hand pick-up device is controlled in a similar manner except, of course, the controlling signal is derived from the cam 71 of FIGURE 8. It will be obvious that the degree of tilt can be controlled by the signals supplied to the conductors 81 and 82.

As the tractor approaches close to the light source the angle formed by the heading of the tractor and the line between the tractor and the light source may become appreciable so that the range reading is not correct. The signal representing the azimuth of the tractor is employed to apply a correction voltage to the range reading. In FIGURE 8 the azimuth indicating signal is supplied to the motor control 113 which functions to cause operation of the motor 114 in a desired direction. The cam 116 is thereby caused to rotate to move the movable contact 117 along the resistor 118 an amount determined by the shape of the cam. The battery 119 is connected across the resistor 118. The correcting voltage on the movable contact 117 is impressed on an end terminal of the resistor 67.

The pick-up devices are maintained at a predetermined absolute elevation by a second set of servo systems. More specifically, in FIGURE 9, the motor control 97 and the motor 98 function to control the absolute elevation of the left-hand pick-up device and the motor control 104 and the motor 106 function to control the absolute elevation of the right-hand pick-up device. In accordance with a positive or negative D.-C. signal from the conductor 96 of FIGURE 7 the motor control 97 will become energized to cause the motor armature to rotate either clockwise or counterclockwise.

Through gear 99, the gear 101 will be rotated. The shaft 102 is threaded and will be lowered or raised in accordance with the direction of rotation of the gear 101.

Motor control 104, motor 106, and gears 111 and 109 function to maintain the right-hand pick-up device at an absolute elevation in response to a D.-C. signal supplied to conductor 107.

Although this invention has been described with respect to a particular embodiment thereof, it is not to be so limited, as changes and modifications may be made therein which are within the full intended scope of the invention as defined by the appended claims.

We claim:
1. In combination, an earth-moving machine having a blade thereon and first means for independently raising or lowering either end of said blade, means located at a fixed geographical point for generating a plurality of signals and including a first source of radiated signals, means for modulating said first source of radiated signals, and a second source of radiated signals, a plurality of receiving means mounted on said earth-moving machine for receiving said radiated signals, means responsive to said received signals to maintain said receiving means at a fixed elevation, means mounted on said earth-moving machine and constructed and arranged to respond to said received signals to produce range indicating and azimuth indicating signals defining the relative positions of said fixed geographical point and the earth-moving machine, means for combining said range and azimuth indicating signals to produce resultant signals representative of the desired elevation of said movable blade, said first means responsive to said resultant signals for independently positioning the ends of the blade of said earth-moving machine with respect to said receiving means whereby the blade of said earth-moving machine is positioned to cut the earth's contour according to a predetermined engineering analysis.

2. In combination, an earth-moving machine having a blade thereon and first means for independently raising or lowering either end of said blade, a plurality of light sources including a synchronizing signal light source located at a fixed geographical location, cylindrical means having a plurality of rows of slots therein and constructed and arranged to rotate about at least one of said light sources to produce first periodic light signals and second periodic light signals, a plurality of means mounted on said earth-moving machine for receiving said synchronizing signal and said periodic light signals, means for discriminating between said synchronizing signal and said perodic light signals, means on said earth-moving machine constructed to respond to said synchronizing signal and said first periodic light signals to produce range indicating signals and azimuth indicating signals defining the relative positions of said fixed geographical point and said earth-moving machine, means for combining said range and azimuth indicating signals to produce resultant signals, said first means responsive to said resultant signals to independently position said receiving means a predetermined distance from the ends of said movable blade, and means constructed and arranged to respond to said periodic light signals to maintain said receiving means at a fixed elevation whereby said blade is positioned to cut the earth's contour according to a predetermined engineering analysis.

3. In combination, an earth-moving machine having a blade thereon and first means for independently raising or lowering either end of said blade, supporting structure for said first means, a first light source and a second light source located at a fixed geographical point, cylinder means having a plurality of rows of apertures formed in the periphery thereof, each row of apertures extending substantially around said cylinder and lying in a plane perpendicular to the axis of said cylinder means, means for rotating said cylinder means to produce a plurality of periodic light signals having different frequencies, means for energizing said first light source once each revolution of said cylinder means to produce a synchronizing signal, receiving means including a plurality of photo-sensitive devices movably mounted upon said first means, means for discriminating between and for separating from each other the synchronizing signal and said periodic light signals received by said photo-sensitive devices, a plurality of means responsive to said synchronizing signal and one of said periodic light signals to produce a range indicating signal and an azimuth indicating signal defining the relative positions of said fixed geographical point and said earth-moving machine, means for combining said range and azimuth indicating signals to produce resultant signals representative of a desired blade elevation for the corresponding range and azimuth indicating signals, said first means responsive to said resultant signals to independently position said photo-sensitive devices upon said first means at predetermined distances from the ends of said movable blade, and means responsive to said periodic light signals received by said photo-sensitive devices to maintain said photo-senstive devices at a predetermined elevation.

References Cited in the file of this patent

UNITED STATES PATENTS

| | | |
|---|---|---|
| 2,421,012 | Chew | May 27, 1947 |
| 2,513,367 | Scott | July 4, 1950 |
| 2,668,288 | Perillow | Feb. 2, 1954 |
| 2,706,289 | Bulleyment | Apr. 12, 1955 |
| 2,710,962 | Fritze | June 14, 1955 |
| 2,728,065 | Hollmann | Dec. 20, 1955 |
| 2,825,054 | Ernst | Feb. 25, 1958 |
| 2,833,941 | Rosenberg | May 6, 1958 |
| 2,875,390 | Tripp | Feb. 24, 1959 |
| 2,894,186 | Cail | July 7, 1959 |
| 2,916,836 | Stewart | Dec. 15, 1959 |
| 2,927,258 | Lippel | Mar. 1, 1960 |